United States Patent [19]

Koch

[11] Patent Number: 5,474,491
[45] Date of Patent: Dec. 12, 1995

[54] MANDREL PIN

[76] Inventor: Jay Koch, 177 Ocean Shore Dr., Key Largo, Fla. 33037

[21] Appl. No.: 392,471

[22] Filed: Feb. 21, 1995

[51] Int. Cl.⁶ .................................................. A22C 21/00
[52] U.S. Cl. .......................................... 452/165; 452/196
[58] Field of Search .................................. 452/165, 185, 452/196

[56]  References Cited

U.S. PATENT DOCUMENTS

| 943,767 | 12/1909 | Bullard | 452/196 |
|---|---|---|---|
| 1,890,907 | 12/1932 | Hoover | 452/196 |
| 4,067,085 | 1/1978 | Gasbarro . | |
| 4,688,297 | 8/1987 | Bartels | 452/165 |
| 4,779,308 | 10/1988 | van de Nieuwelaar . | |
| 4,780,930 | 11/1988 | Sparkia | 452/165 |
| 4,937,918 | 7/1990 | Martin . | |
| 4,958,408 | 9/1990 | Meyn . | |
| 5,069,652 | 12/1991 | Hazenbroek | 452/165 |
| 5,123,872 | 6/1992 | Tieleman et al. | 452/149 |

Primary Examiner—Willis Little
Attorney, Agent, or Firm—Ray F. Cox, Jr.

[57] ABSTRACT

An improvement to the type of poultry processing machinery in which a poultry carcass is placed upon a cone shaped mandrel carried past various processing stations by a conveyor. The improvement comprises a pin with a piercing point carried by the mandrel such that the pin pierces the keel bone of the poultry carcass to more firmly fix the poultry carcass in position upon the mandrel. In one embodiment the pin is mechanically retractable and extendable. In another embodiment, the pin is fixed in position upon the mandrel.

3 Claims, 6 Drawing Sheets

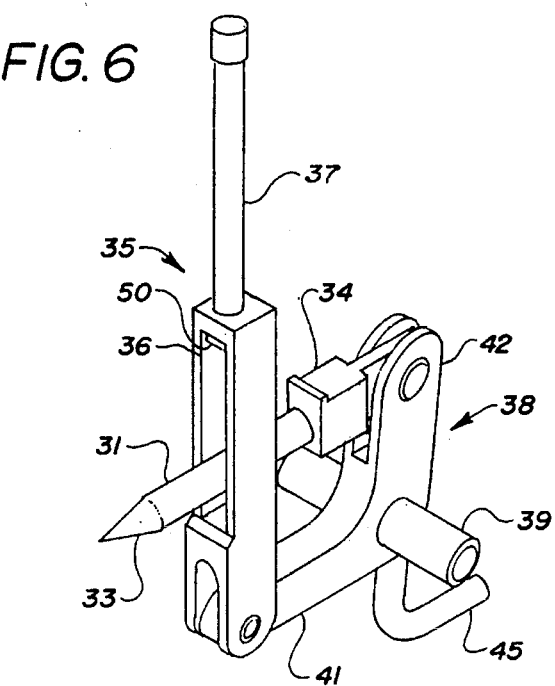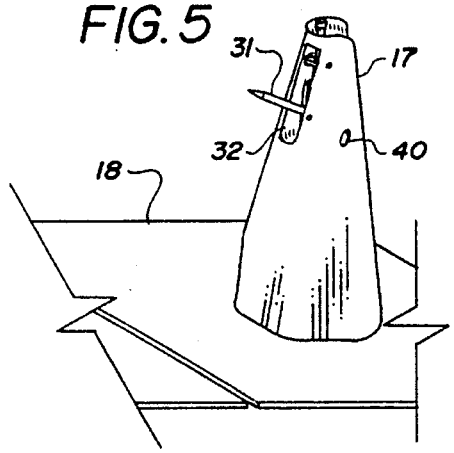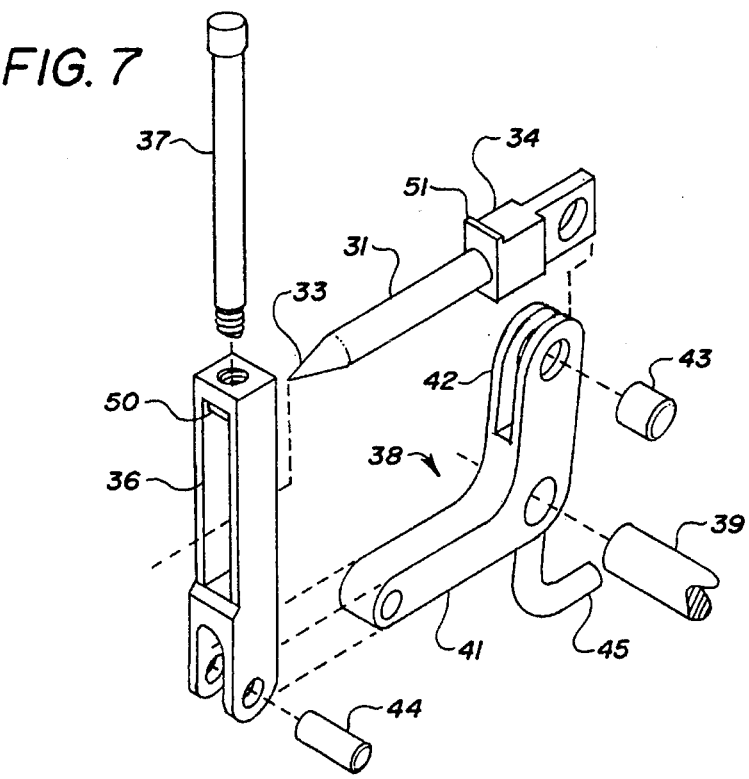

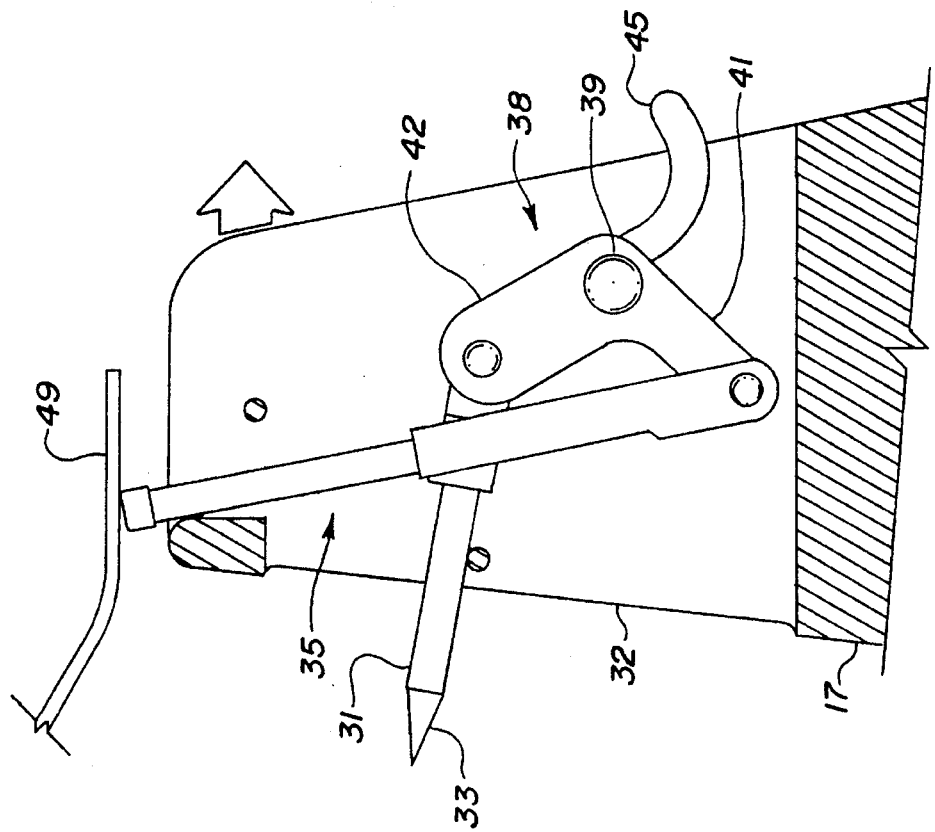
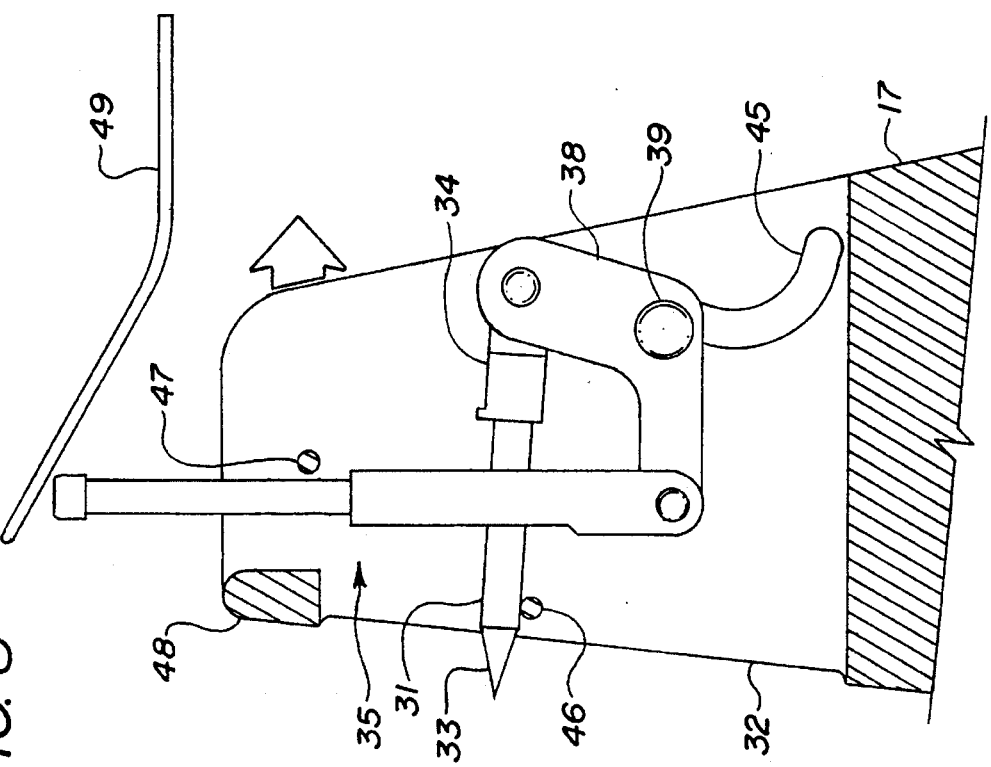

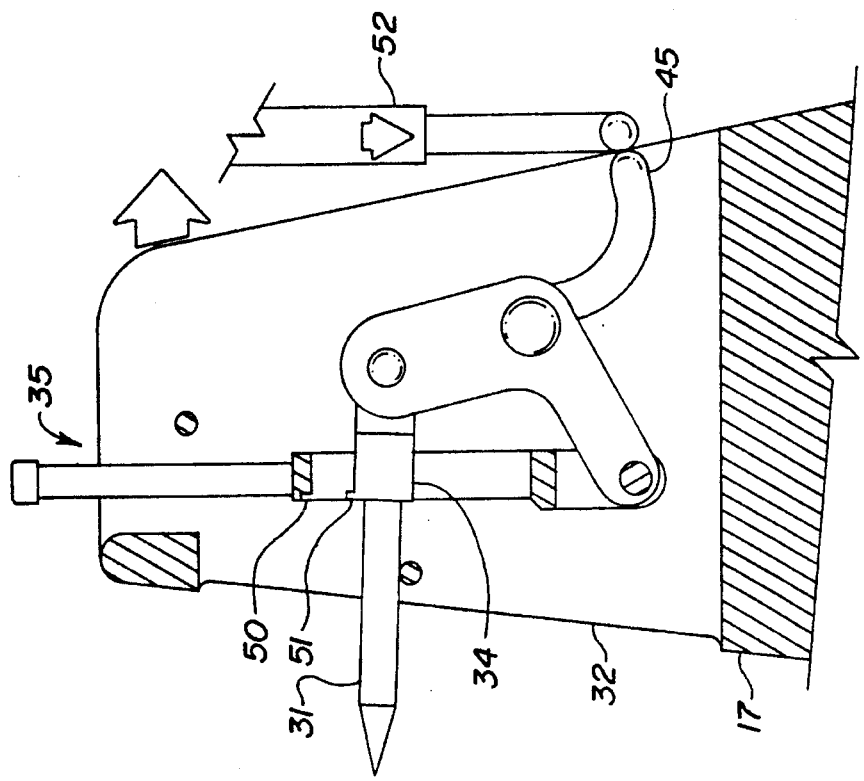

MANDREL PIN

BACKGROUND OF THE INVENTION

This invention relates to machinery for processing poultry carcasses and in particular to the type of poultry processing machinery in which a poultry carcass is placed upon a cone-shaped mandrel carried by a conveyor past various processing stations.

The processing of poultry carcasses involves numerous processing steps which act to sever selected portions of the poultry from the carcass while minimizing the wastage of useable meat. A typical type of poultry processing apparatus is disclosed in U.S. Pat. No. 4,937,918, the disclosure of which is incorporated herein by reference. The apparatus disclosed in this patent includes a conveyor on which a plurality of cone-shaped mandrels are affixed. The cone-shaped mandrel is designed to receive a poultry carcass and to maintain the poultry carcass in a fixed position as the mandrel and carcass are conveyed past various processing stations. This type of processing apparatus is particularly used in boning the breast of poultry. Typically a breast half-carcass is placed over the mandrel for deboning. The debone operation can be accomplished both with the wings attached or the wings removed. While on the mandrel, the breast meat is severed from the carcass by cutting through various tendons and cartilage. The breast meat is then torn free of the cartilage either manually by human operators or by automated equipment.

Whether the operation is performed by human operators or by automated equipment, considerable tension is placed on the bony parts of the carcass which often result in the carcass being torn free of the mandrel. When this occurs, the partially deboned carcass may fall to the floor or other non-sanitary areas causing both the carcasses and remaining meat to be condemned and thereby reducing processing efficiency. Even if the carcasses are not condemned, it may be necessary to rework the carcasses by hand resulting in increased labor and reduced meat yield.

It is an object of the present invention to overcome the problems of the prior art by fixing the carcass in position on the mandrel through the means of a carefully positioned pointed pin. The pin is attached to the mandrel at such a location that the pin pierces the bony portion of the keel bone of the poultry carcass somewhere below the loose upper cartilage. The poultry carcass is therefore held more firmly in position during subsequent processing operations.

SUMMARY OF THE INVENTION

The present invention comprises a pointed pin attached to the mandrel such that when a poultry carcass is placed on the mandrel the pointed pin pierces the bony portion of the keel bone of the poultry carcass. The pin can be of any configuration so long as it is pointed. Various cross sections, such as round, square, half round or triangular, would all be acceptable. If the pin is positioned properly, the carcass upon being loaded onto the mandrel, either by manual or automatic means, will be fixed into position by the seating of the pin in the keel bone. Once the boning operation is started, additional tension may be brought against the carcass. However, this tension only causes the carcass to seat more firmly against the pin.

In one embodiment of the present invention, the pin is immovably fixed in the surface of the mandrel. The pin is oriented so that placing the carcass on the mandrel will cause the pin to become seated in the keel bone. Multiple pins, either bent or straight, may be employed as necessary to more firmly affix the carcass to the mandrel.

In an alternative embodiment of the present invention, the pin is retractable and extendable relative to the mandrel. In this alternative embodiment the carcass is placed on the mandrel while the pin is retracted. The pin may then be driven into the keel bone of the poultry carcass. Once the processing of the carcass is completed, the pin may be retracted to facilitate removal of the remaining portions of the poultry carcass from the mandrel.

It is therefore an object of the present invention to provide for a pin to fix a poultry carcass in position on a mandrel for greater stability during processing of the poultry carcass.

It is a further object of the present invention to provide for a pin which is retractable and extendable from a mandrel to facilitate both the fixing of a poultry carcass in position on a mandrel and removal of a poultry carcass from a mandrel upon completion of processing.

Other objects and advantages of the present invention will be apparent to those skilled in the art from an examination of the detailed description of the preferred embodiments in conjunction with the appended drawings as described below.

DESCRIPTION OF THE DRAWINGS

FIG. 5 is a perspective view of a mandrel on a conveyor. The mandrel is provided with the retractable pin embodiment of the present invention.

FIG. 6 is a perspective view of the retractable pin of the present invention.

FIG. 7 is an exploded perspective view of the retractable pin.

FIG. 8 is a sectional elevation of the retractable pin in its retracted position.

FIG. 9 is a sectional elevation of the retractable pin in its extended position.

FIG. 10 is a sectional elevation of the retractable pin in its extended position showing one embodiment of the locking mechanism.

FIG. 11 is a sectional elevation of the retractable pin illustrating how the pin of FIG. 10 is unlocked for retraction.

DETAILED DESCRIPTION OF THE PREFERRED EMBODIMENTS

Figure 1:
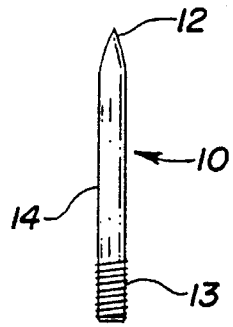
FIG. 1 is an elevation view of a straight pin configuration.
Figure 2:
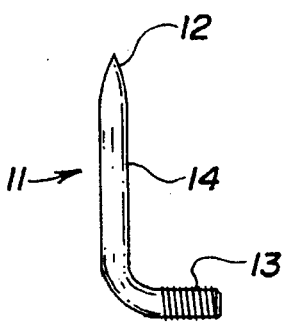
FIG. 2 is an elevation view of a bent pin configuration.
Figure 3:
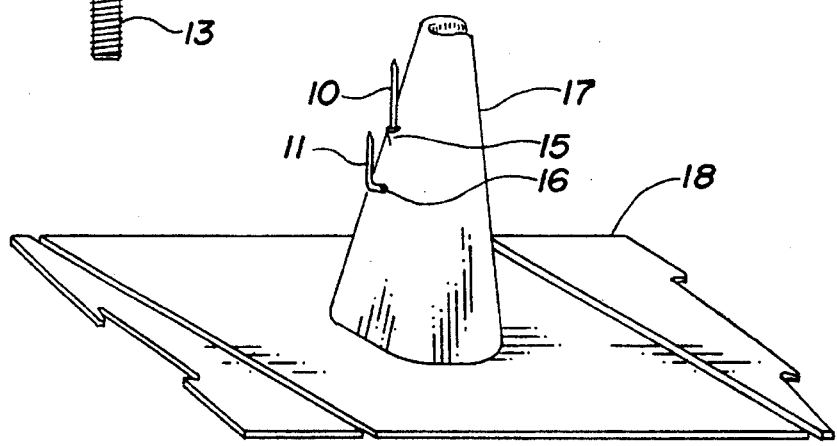
FIG. 3 is a perspective view of a mandrel situated on a conveyor, the mandrel having both a straight pin and a bent pin affixed.

One of the preferred embodiments of the present invention is described with reference to FIGS. 1 through 4. With particular reference to FIG. 3, a mandrel 17 is affixed to the surface of a conveyor 18. The conveyor 18 moves the mandrel 17 past various processing stations.

Figure 4:
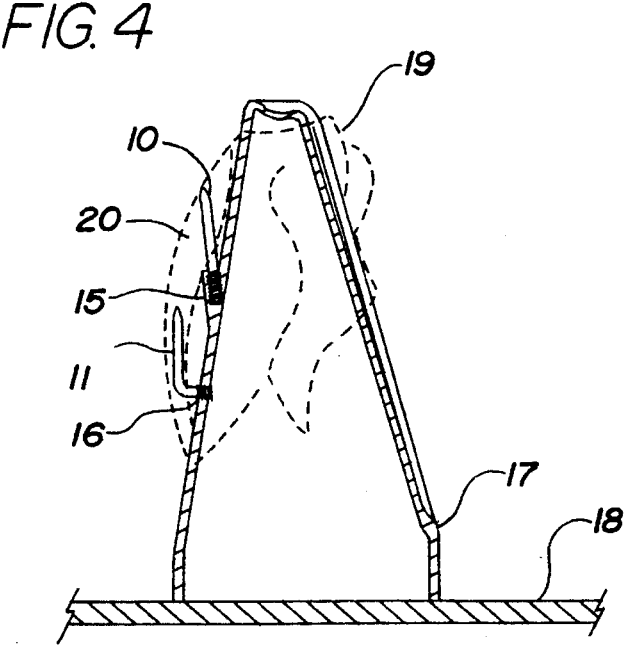
FIG. 4 is a sectional elevation of the mandrel and conveyor of FIG. 3 with a poultry carcass in place.

As may be seen from FIG. 4, the mandrel 17 is cone shaped and is sized and shaped to receive an eviscerated poultry carcass 19 such that the cone-shaped mandrel 17 fits inside the body cavity of the poultry carcass 19 and supports the poultry carcass 19 in the proper position for automatic processing of the poultry carcass 19. Typically a poultry carcass 19 which is processed in this fashion consists only of the front half of a poultry carcass, the legs, thighs and other parts of the rear portion of the poultry carcass 19 having already been processed and removed. The front half of the poultry carcass 19 will typically include the wings, breast, back and rib cage. In particular, the poultry carcass 19 will include the keel bone 20.

This embodiment of the present invention comprises one or more pins 10, 11 which are rigidly fastened to the mandrel 17. The pins 10, 11 are immobile relative to the mandrel 17 and oriented in a generally upward direction. The pins 10, 11 are provided with a piercing point 12 as shown in FIGS. 1 and 2. In the preferred embodiment, the pin 10, 11 is provided with a straight portion 14 and a threaded portion 13. The threaded portion 13 is threadedly received in a suitable opening 15, 16 in the mandrel 17. While threaded connections are desirable for ease in removal of the pins 10, 11 for easy cleaning, other suitable forms of connection of the pin 10, 11 to the mandrel 17 would be readily apparent to those skilled in the art and would be considered to fall within the scope of the present invention.

The pin 10, 11 may be formed of any of a number of cross sectional shapes; for example, round, square, triangular or half round.

As may be seen from FIGS. 3 and 4, the pin 10, 11 is oriented in a generally upward-facing direction so as to pierce the keel bone 20 of the poultry carcass 19 when the poultry carcass 19 is placed in position on the mandrel 17. Placement of the poultry carcass 19 on the mandrel 17 may be performed manually by a human operator or by automatic machinery. In either method of loading the poultry carcass 19, the generally upward orientation of the pin 10, 11 is necessary to ensure that it meets and pierces the keel bone 20 to fix the poultry carcass 19 firmly in position on the mandrel 17. The simplest method of orienting a pin 10 on the mandrel 17 so as to fulfill these requirements is illustrated in FIGS. 1, 3 and 4. In this alternative embodiment, the pin 10 is straight throughout its length. The pin 10 must therefore be affixed to the mandrel 17 at a relatively acute angle. In certain applications, this form of connection of the pin 10 to the mandrel 17 may exhibit mechanical weakness. An alternative embodiment is described with reference to FIGS. 2, 3 and 4. In this alternative embodiment, the mechanical weakness that may occur with pin 10 is reduced in a bent pin 11. The bent pin 11 may be attached to the mandrel 17 such that the point of connection is essentially orthogonal to the surface of the mandrel 17 while the straight portion 14 of the pin 11 is oriented in a generally upward direction.

While the use of a single pin 10, 11 has been found to be satisfactory in stably supporting a poultry carcass 19 in position on a mandrel 17 for processing, multiple pins 10, 11 are contemplated within the scope of the present invention. Multiple pins may be especially desirable in the case of larger forms of poultry such as turkeys.

Another preferred embodiment of the present invention is described with reference to FIGS. 6 through 11. While the preferred embodiment discussed above is essentially immobile with respect to the mandrel 17, the preferred embodiment discussed below provides for a pin 31 which may be mechanically retracted and extended. By allowing the pin 31 to be mechanically retracted and extended, the pin 31 may be placed in a more generally horizontal position since the pin 31 may be retracted when the poultry carcass 19 is placed on the mandrel 17. By then extending the pin 31 so as to pierce the keel bone 20 of the poultry carcass 19, the poultry carcass 19 is more firmly affixed in position on the mandrel 17.

In order to accommodate this preferred embodiment of the present invention, the mandrel 17 must be altered to accommodate the pin 31 and the associated extension and retraction mechanism. A standard mandrel 17 may be altered by milling a vertical slot 32 through the top of the mandrel 17 as shown in FIG. 5. The slot 32 extends longitudinally through the top of the mandrel 17. Longitudinal is considered to be along the direction of motion of the conveyor 18.

The assembled and exploded views of the preferred embodiment are shown in FIGS. 6 and 7 respectively. The mechanism comprises the pin 31 having a piercing point 33. The end of the pin 31 opposed to the piercing point 33 is affixed to a pin holder 34. The pin 31 may be affixed to the pin holder 34 by a removable connection such as a threaded connection. A removable connection is desirable both for ease in disassembling the mechanism for cleaning and also for replacement of the pin 31 should it become damaged.

While the pin 31 and pin holder 34 are generally disposed in a horizontal orientation, a plunger 35 is generally disposed in a vertical orientation. The plunger 35 comprises a slotted portion 36 through which the pin 31 passes and a removable extension 37 which is threadedly received in the slotted portion 36. The extension 37 is sized so as to extend above the top of the mandrel 17.

An L-shaped lever 38 is pivotally connected to the mandrel 17 by a pin 39 for pivotal motion about an axis transverse to the direction of motion of the conveyor 18. The pivot 39 may be pivotally mounted in the mandrel 17 through holes 40 drilled transversely through the mandrel 17.

The L-shaped lever comprises a plunger arm 41 and a pin arm 42. The pin holder 34 is pivotally connected to the pin arm 42 by a pin pivot 43. The slotted portion 36 of the plunger 35 is pivotally connected to the plunger arm 41 by a plunger pivot 44.

Finally, a trigger arm 45 is rigidly affixed to the L-shaped lever 38 in the vicinity of the pivot 39.

Figure 13:
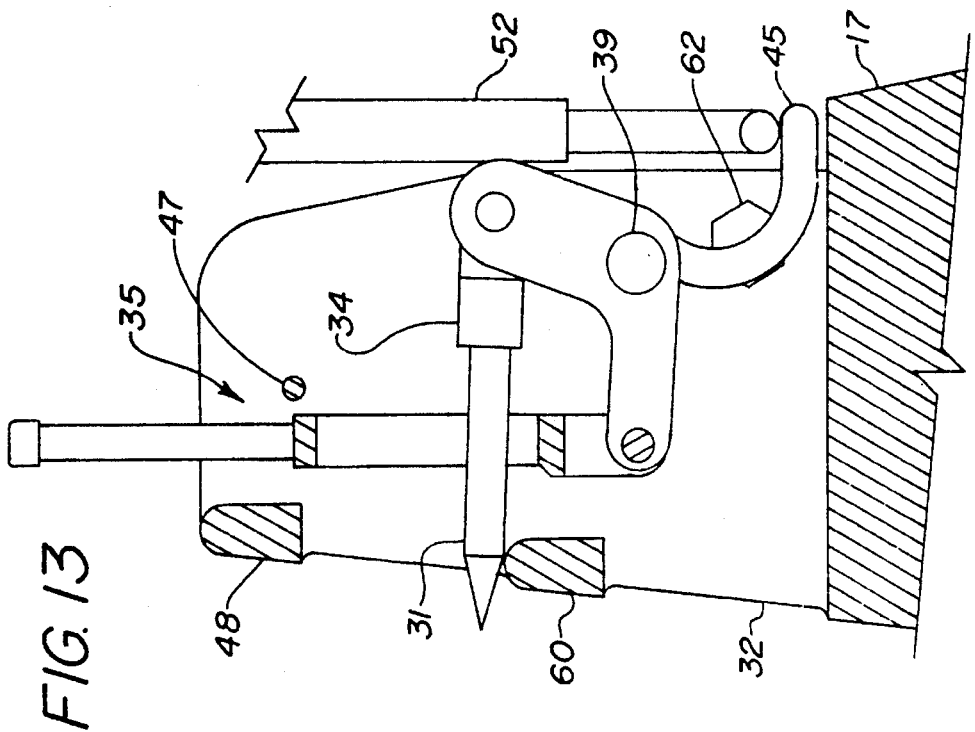
FIG. 13 is a sectional elevation of the retractable pin in the retracted position illustrating the alternative locking mechanism of FIG. 12.
Figure 12:
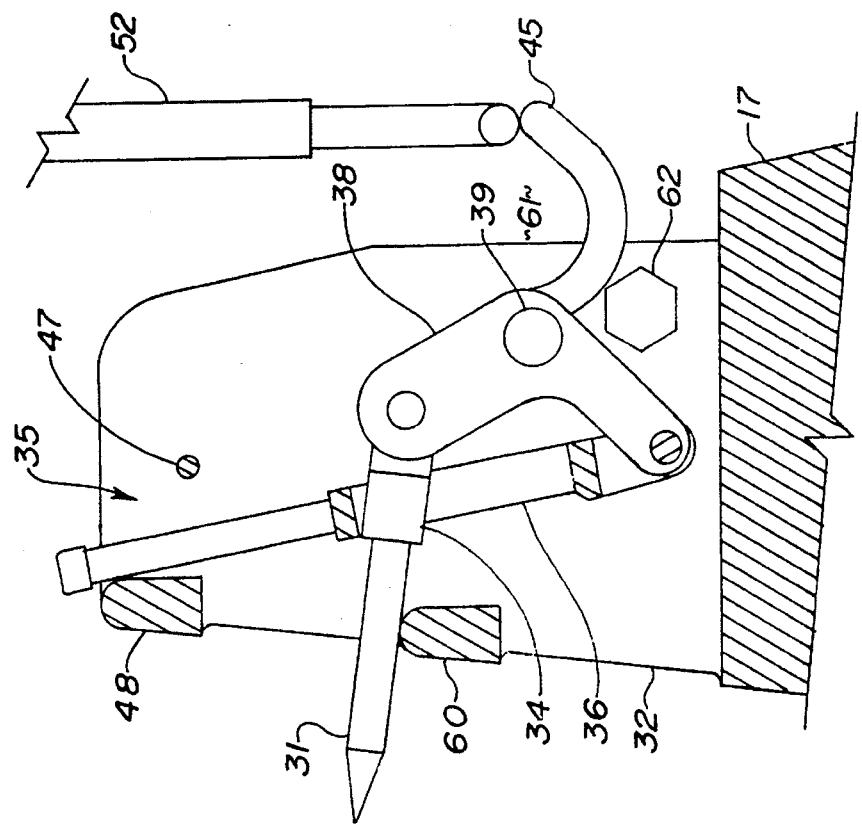
FIG. 12 is a sectional elevation of the retractable pin in its extended position showing an alternative embodiment of the locking mechanism.

The action of the extension and retraction mechanism is shown with reference to FIGS. 8 through 11. FIG. 8 shows the mechanism in the fully retracted position in which the pin 31 is retracted into the slot 32 in the mandrel 17. A pin rest 46 may be provided to prevent the pin 31 from falling out of an essentially horizontal orientation. For greater mechanical stregth, the pin rest 46 may be replaced by a ledge 60 as shown in FIGS. 12 and 13. (The ledge 60 is simply a portion of the mandrel not milled out the produce the slot 32.) Likewise, the plunger 35 may be maintained in an essentially vertical position by a plunger stop 47 and an unslotted portion 48 of the mandrel 17 such that the plunger 35 is maintained therebetween.

In the retracted position the L-shaped lever 38 is rotated (clockwise in the orientation shown on FIG. 8) so as to withdraw the pin 31 into the slot 32. This rotation of the L-shaped lever 38 also acts to raise the plunger 35 through the slot 32 until it protrudes from the top of the mandrel 17. In this position the trigger arm 45 is also retracted within the slot 42.

The retracted position is essentially the position existing immediately after a poultry carcass 19 is loaded onto the mandrel 17. The act of loading the poultry carcass 19 may, in fact, push the pin 31 completely back into the slot 32. At this point in time the piercing point 33 of the pin 31 is resting against the keel bone 20 of the poultry carcass 19. After loading the poultry carcass 19 onto the mandrel 17, the plunger 35 is depressed. The plunger 35 may be depressed by a mechanical ramp 49 as shown in FIGS. 8 and 9 or by various other means which would be readily apparent to those skilled in the art such as pneumatic, hydraulic or other means.

As is shown in FIGS. 8 and 9, the motion of the mandrel 17 moves the plunger 35 against the ramp 49. The inclination of the ramp 49 causes the plunger 35 to be depressed. Depression of the plunger 35 presses against the plunger arm 41 of the L-shaped lever 38 causing the L-shaped lever 38 to rotate (counterclockwise in the orientation shown in FIG. 9) about the pivot 39. The rotation of the L-shaped lever 38, and in particular the rotation of the pin arm 42, causes the pin holder 34 and pin 31 to be extended. The piercing point 33 of the pin 31 thereby pierces the keel bone 20 of the poultry carcass 19. Additionally, the rotation of the L-shaped lever 38 causes the trigger arm 45 to be extended out of the slot 32.

When the pin 31 is fully extended, it may be locked into position as described with reference to FIG. 10. The slotted portion 36 of the plunger 35 is provided with a horizontal square shoulder 50. The pin holder 34 is provided with a raised notch 51 complementary to the square shoulder 50 of the plunger 35. When the plunger 35 is fully depressed the square shoulder 50 engages the raised notch 51, thereby effectively preventing the pin 31 from being retracted into the slot 32.

In order to disengage the locking mechanism formed by the square shoulder 50 and the raised notch 51, pressure is applied to the trigger arm 45 by triggering means operating in an essentially vertical motion. This vertical pressure against the trigger arm 45 may be applied by any of a number of means readily apparent to those skilled in the art, such as hydraulic, pneumatic or electric means. Electric, hydraulic or pneumatic trigger means 52 as shown in FIGS. 10 and 11 applies downward pressure against the trigger arm 45. The downward pressure against the trigger arm 45 causes the L-shaped lever 38 to rotate (clockwise in the configuration shown in FIGS. 10 and 11). The rotation of the L-shaped lever 38 acts to raise the plunger 35, thereby freeing the raised notch 51 from the square shoulder 50 thereby unlocking the pin 31. Continued pressure against the trigger arm 45 produces further rotation of the L-shaped lever 38 causing the pin 31 to retract into the slot 32 and causing the plunger 35 to rise vertically through the top of the mandrel 17. At this point the mechanism is fully retracted and reset for repeating the cycle of operation described above.

Figure 14:
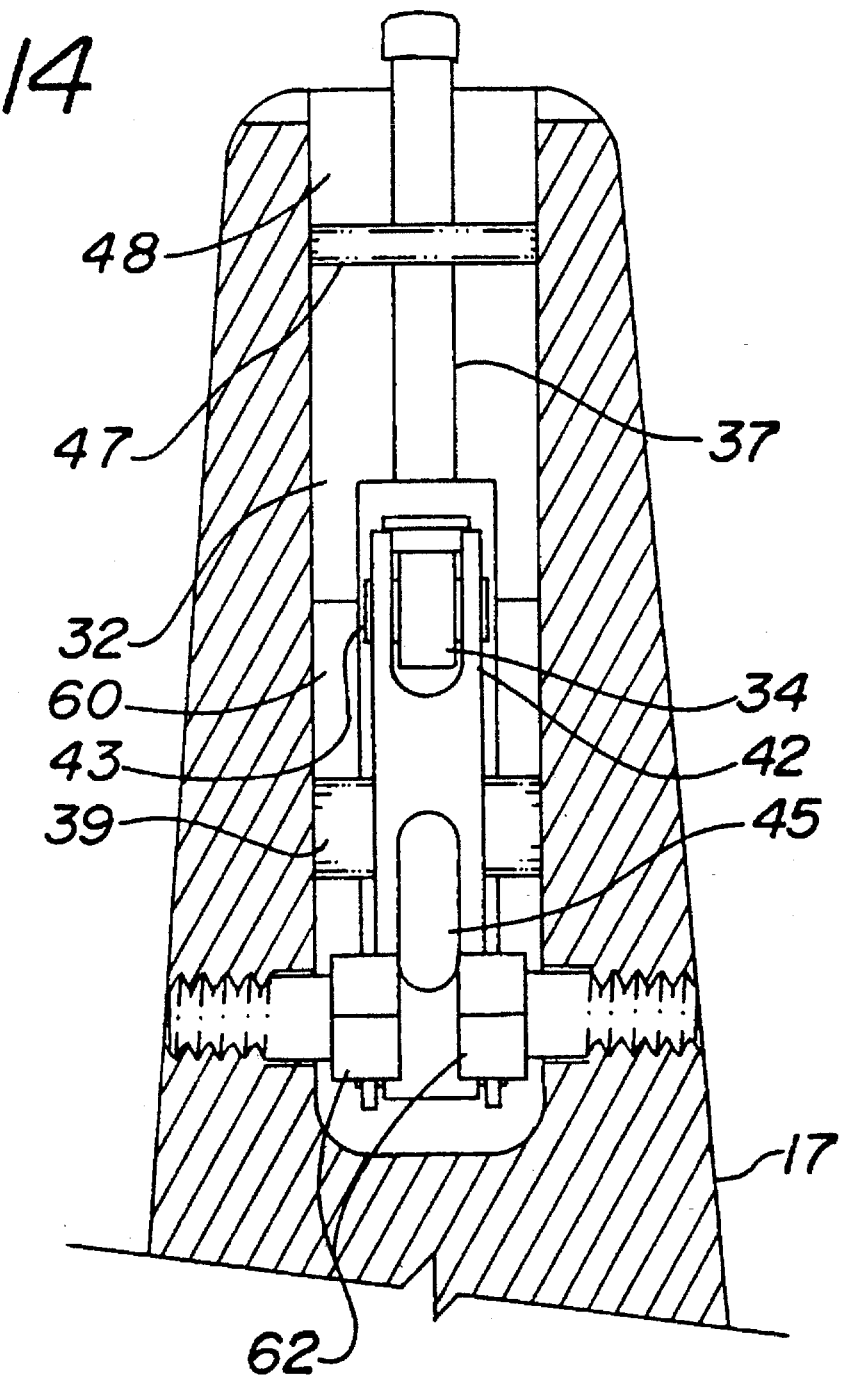
FIG. 14 is rear elevation of the retractable pin further illustrating the alternative locking mechanism of FIGS. 12 and 13.

An alternative locking mechanism is described with reference to FIGS. 12, 13, and 14. In place of the notch 51 and shoulder 50 described above, brakes 62 are provided in the rear portion 61 of the milled slot 32. In the preferred embodiment the brakes 62 are in the form of bolts of a suitable friction producing material oriented horizontally and threadedly received in the sides of the slot 61 of the mandrel 17. The heads of the brakes 62 bear against the trigger arm 45, thus preventing motion of the trigger arm 45 relative to the mandrel 17 except under the influence of the plunger 35 or the trigger means 52. The brakes 62 may be threadedly adjusted for wear and misalignment so as to maintain the appropriate frictional pressure on the trigger arm 45.

The present invention has been described with reference to certain preferred and alternative embodiments which are by way of example only and not by way of limitation to the full scope of the present invention which is set forth in the appended claims.

What is claimed is:

1. In a mandrel for supporting a poultry carcass on a conveyor for processing, the improvement comprising:

a pin having a pointed end attached to said mandrel and oriented so as to pierce the keel bone of said poultry when said poultry carcass is placed on said mandrel for processing so as to stabilize said poultry carcass on said mandrel during processing;

means for extending said pin from said mandrel and retracting said pin into said mandrel; and means for locking said pin into an extended position;

wherein said means for extending and retracting comprises:

(a) a slot extending longitudinally through the top of said mandrel, (b) an L-shaped lever pivotally mounted in said slot, and having a plunger arm and a pin arm and a pivot therebetween, (c) a plunger pivotally mounted to said plunger arm and extending therefrom generally vertically through said slot, (d) a pin holder having a first end pivotally mounted to said pin arm and a second end having means for rigidly attaching said pin so that said pointed end of said pin is extended generally horizontally therefrom, and (e) a trigger arm rigidly affixed to said L-shaped lever at said pivot and extending rearwardly relative to said pointed end of said pin;

such that downward pressure on said plunger causes said L-shaped lever to rotate thereby extending said pin and downward pressure on said trigger arm causes reverse rotation of said L-shaped level thereby retracting said pin.

2. The improvement of claim 1 wherein said means for locking comprises:

(a) a slotted portion of said plunger receiving said pin and said pin holder and having a horizontal square shoulder above said pin and said pin holder, and (b) a raised notch disposed on an upper surface of said pin holder so as to engage said square shoulder when said pin is fully extended, thereby preventing said pin from retracting.

3. The improvement of claim 1 wherein said means for locking comprises one or more brakes bearing frictionally upon said trigger arm.

* * * * *